US012627682B2

(12) United States Patent
Wu

(10) Patent No.: US 12,627,682 B2
(45) Date of Patent: May 12, 2026

(54) METHOD FOR IDENTIFYING SOURCE ADDRESS OF PACKET AND APPARATUS

(71) Applicant: HUAWEI TECHNOLOGIES CO., LTD., Shenzhen (CN)

(72) Inventor: Bo Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 18/609,958

(22) Filed: Mar. 19, 2024

(65) Prior Publication Data

US 2024/0223584 A1    Jul. 4, 2024

Related U.S. Application Data

(63) Continuation of application No. PCT/CN2022/091003, filed on May 5, 2022.

(30) Foreign Application Priority Data

Oct. 15, 2021    (CN) .......................... 202111203775.5

(51) Int. Cl.
| H04L 9/40 | (2022.01) |
| H04L 1/1829 | (2023.01) |
| H04L 69/164 | (2022.01) |

(52) U.S. Cl.
CPC ........ H04L 63/1416 (2013.01); H04L 1/1858 (2013.01); H04L 63/0236 (2013.01); H04L 69/164 (2013.01)

(58) Field of Classification Search
CPC ............... H04L 9/3271; H04L 41/0896; H04L 43/062; H04L 63/1408; H04L 63/1458; H04L 67/561; H04L 67/63; H04W 76/22
See application file for complete search history.

(56) References Cited

U.S. PATENT DOCUMENTS

| 6,816,910 B1* | 11/2004 | Ricciulli ............. H04L 41/0896 |
| | | 370/242 |
| 7,620,733 B1* | 11/2009 | Tzakikario .......... H04L 63/1458 |
| | | 709/229 |

(Continued)

FOREIGN PATENT DOCUMENTS

| CN | 103685293 A | 3/2014 |
| CN | 103701794 A | 4/2014 |
| CN | 103701795 A | 4/2014 |
| CN | 109309685 A | 2/2019 |
| CN | 108551446 B | 11/2020 |

OTHER PUBLICATIONS

M.Duke et al.: "QUIC-LB: Generating Routable QUIC Connection IDs, draft-duke-quic-load-balancers-06," QUIC, Internet-Draft, Intended status: Standards Track, Nov. 4, 2019, total 31 pages, XP015136126.

(Continued)

*Primary Examiner* — Dustin Nguyen
(74) *Attorney, Agent, or Firm* — WOMBLE BOND DICKINSON (US) LLP

(57) ABSTRACT

This application discloses a method for identifying a source address of a packet and an apparatus, and pertains to the field of network security. A protecting device intercepts a packet whose destination address is an IP address of a protected device, where the protected device provides a service according to the QUIC protocol. The protecting device sends a retry packet to a source address of the packet in response to that the packet is an initial packet. The protecting device identifies the source address of the packet as an attack source address if the protecting device receives no response packet corresponding to the retry packet. The protecting device determines the source address of the intercepted initial packet to identify an attack source address used by an attacker, and subsequently prevents only packets from the attack source address from being sent to the protected device.

20 Claims, 4 Drawing Sheets

(56)                    References Cited

U.S. PATENT DOCUMENTS

| | | | | |
|---|---|---|---|---|
| 2003/0145233 A1* | 7/2003 | Poletto | ............... | H04L 63/1408 |
| | | | | 726/13 |
| 2005/0259645 A1* | 11/2005 | Chen | ....................... | H04L 67/63 |
| | | | | 370/389 |
| 2012/0227088 A1* | 9/2012 | Gao | ................... | H04L 63/1458 |
| | | | | 726/3 |
| 2013/0152189 A1* | 6/2013 | Lee | .................... | H04L 63/1408 |
| | | | | 726/13 |
| 2015/0333912 A1* | 11/2015 | Graham-Cumming | ..................... | |
| | | | | H04L 9/3271 |
| | | | | 713/168 |
| 2020/0120555 A1* | 4/2020 | Patil | ..................... | H04W 76/22 |
| 2021/0099482 A1* | 4/2021 | Doron | .................. | H04L 43/062 |
| 2022/0311746 A1* | 9/2022 | Boucadair | ............ | H04L 67/561 |
| 2023/0208857 A1* | 6/2023 | Medvedovsky | .... | H04L 63/1458 |
| | | | | 726/13 |

OTHER PUBLICATIONS

Anonymous:"Replay attack-Wikipedia", Feb. 14, 2018 (Feb. 14, 2018), XP055586518, Retrieved from the internet: https://en.wikipedia.org/w/index.php?title=Replay_attackandoldid=825629016#Timesamps, total 5 pages.
Iyengar J et al: "QUIC: A UDP-Based Multiplexed and Secure Transport; rfc9000.txt", QUIC: a UDP-Based Multiplexed and Secure Transport; RFC9000.TXT, Internet Engineering Task Force, IETF; Standard, Internet Society (ISOC) 4, Rue Des Falaises CH-1205 Geneva, Switzerland, May 27, 2021 (May 27, 2021), total 95 pages, XP015146226, Retrieved from the Internet: https://tools.ietf.org/html/rfc9000.

* cited by examiner

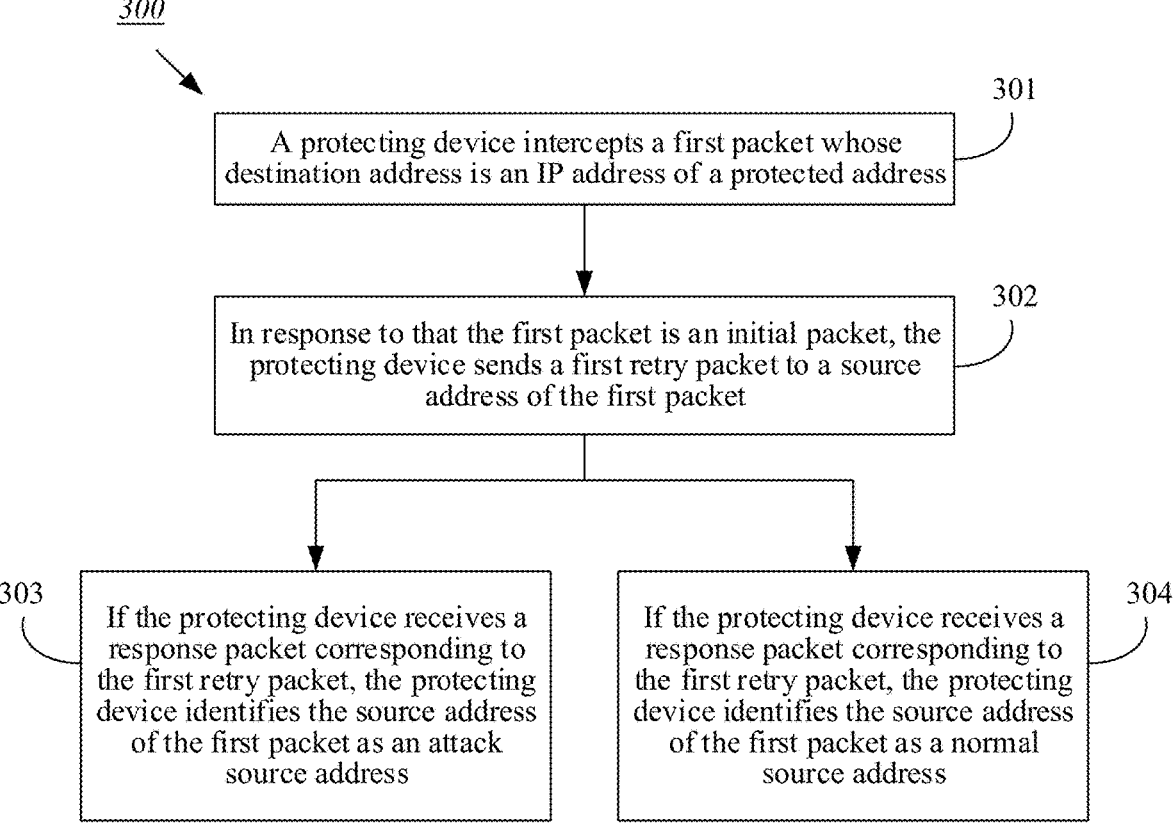

_300_

301

A protecting device intercepts a first packet whose destination address is an IP address of a protected address

302

In response to that the first packet is an initial packet, the protecting device sends a first retry packet to a source address of the first packet

303

If the protecting device receives a response packet corresponding to the first retry packet, the protecting device identifies the source address of the first packet as an attack source address

304

If the protecting device receives a response packet corresponding to the first retry packet, the protecting device identifies the source address of the first packet as a normal source address

FIG. 3

METHOD FOR IDENTIFYING SOURCE ADDRESS OF PACKET AND APPARATUS

CROSS-REFERENCE TO RELATED APPLICATIONS

This application is a continuation of International Application No. PCT/CN2022/091003, filed on May 5, 2022, which claims priority to Chinese Patent Application No. 202111203775.5, filed on Oct. 15, 2021. The disclosures of the aforementioned applications are hereby incorporated by reference in their entireties.

TECHNICAL FIELD

This application relates to the field of network security, and in particular, to a method for identifying a source address of a packet and an apparatus.

BACKGROUND

A denial of service (DOS) attack is a network attack method. A principle of the DoS attack is that an attacker (also referred to as a hacker) controls a controlled computer to send a large quantity of packets to an attack target, so that the attack target is busy processing the packets from the attacker, thereby exhausting system resources such as a computing resource and a network resource of the attack target. As a result, the attack target cannot respond to service requests from normal users. A manner in which the attacker uses two or more controlled computers in a network to launch the DOS attack is referred to as a distributed denial of service (DDOS) attack.

A user datagram protocol (UDP) flood (UDP flood) attack is a type of DDOS attack that has great harm and is difficult to defend against. The attacker launches the UDP flood attack by sending a large quantity of UDP packets to the attack target.

The conventional UDP flood attack defense solution depends on a rate limiting mechanism of a firewall. Specifically, the firewall uses an internet protocol (IP) address of a protected server as a statistical object, and collects statistics on a transmission rate of a packet whose destination address is the IP address. If the transmission rate exceeds a threshold, the firewall discards a subsequent packet that accesses the protected server.

However, in the foregoing manner, the firewall cannot identify whether the packet is a normal packet from a normal client or an attack packet from an attacker. As a result, the normal packet may also be discarded by the firewall, thereby damaging the normal service.

SUMMARY

This application provides a method for identifying a source address of a packet and an apparatus, to resolve a current problem that a normal service may be damaged by inability to identify whether a packet is from a normal client or an attacker.

According to a first aspect, a method for identifying a source address of a packet is provided. A protecting device intercepts a first packet whose destination address is an IP address of a protected device, and the protected device provides a service according to the quick UDP internet connections (QUIC) protocol. In response to that the first packet is an initial packet, the protecting device sends a first retry packet to a source address of the first packet. If the protecting device receives no response packet corresponding to the first retry packet, the protecting device identifies the source address of the first packet as an attack source address.

In the QUIC protocol, when a client wants to access the protected device, the client first needs to establish a communication connection to the protected device. In a process of establishing the communication connection, the client sends an initial packet to the protected device. In an embodiment, the protecting device intercepts a packet sent to the protected device, and sends a retry packet to the source address of the intercepted initial packet. For a normal client, if the normal client receives the retry packet, the normal client responds to the retry packet, that is, sends a response packet corresponding to the retry packet. For an attacker, the attacker uses a forged source IP address to send a packet to the protected device, and therefore, the attacker does not respond to the retry packet. Based on this, in an embodiment, the protecting device can determine, based on whether the response packet corresponding to the retry packet is received, whether the source address of the intercepted initial packet is an attack source address or a normal source address. In this way, the source address of the packet is effectively identified. Further, the protecting device determines a packet from the attack source address as an attack packet, and then prevents the attack packet from being sent to the protected device. In addition, the protecting device determines a packet from the normal source address as a normal packet and then sends the normal packet to the protected device. This can not only effectively defend against an attack, but also ensure normal service running, thereby improving normal service running reliability.

In an embodiment, if the protecting device receives no response packet corresponding to the first retry packet, the protecting device updates a verification failure count corresponding to the source address of the first packet. If the updated verification failure count corresponding to the source address of the first packet reaches a threshold, the protecting device identifies the source address of the first packet as the attack source address.

Further, if the updated verification failure count corresponding to the source address of the first packet does not reach a threshold, after subsequently receiving another initial packet from the source address of the first packet and whose destination address is the IP address of the protected device, the protecting device sends a second retry packet to the source address of the first packet, to verify the source address of the first packet again. Optionally, the threshold is greater than or equal to 1. If the threshold is equal to 1, the protecting device identifies the source address as the attack source address when the source address fails verification for the first time. If the threshold is greater than 1, the protecting device identifies the source address as the attack source address only when a same source address fails verification for a plurality of times.

In an embodiment, if the protecting device receives the response packet corresponding to the first retry packet, the protecting device identifies the source address of the first packet as the normal source address.

In an embodiment, after the protecting device identifies the source address of the first packet as the normal source address, the protecting device sends a connection close packet to the source address of the first packet. The connection close packet indicates to end a current connection, so that a device sending the first packet resends the initial packet to the protected device when the device needs to access the protected device.

After the protecting device identifies the source address of the first packet as the normal source address, when the protecting device receives a packet (regardless of whether the packet is an initial packet or a service packet) from the source address of the first packet again, the protecting device sends the packet to the protected device, so that a communication connection between the source end device of the first packet and the protected device can be established for normal communication.

In an embodiment, the protecting device sends the first retry packet to the source address of the first packet in response to that the source address of the first packet is an unknown address and the first packet is the initial packet. In an embodiment, if the source address of the first packet is a known address, or the first packet is not an initial packet, the protecting device does not send the first retry packet to the source address of the first packet.

In an embodiment, the protecting device further intercepts a second packet whose destination address is the IP address of the protected device. In response to that a source address of the second packet is an unknown address and the second packet is not an initial packet, the protecting device discards the second packet.

Because the normal client can access the protected device only after establishing a communication connection to the protected device, before sending the service packet to the protected device, the normal client sends the initial packet to the protected device to establish the communication connection to the protected device. If the source address of the first packet is an unknown address, it indicates that the device sending the first packet has not yet sent the initial packet to the protected device, or does not respond to the retry packet sent by the protecting device after sending the initial packet to the protected device. Therefore, the protecting device does not identify the source address as the normal source address. In this case, the source address of the first packet is largely an attack source address, and therefore the protecting device directly discards the first packet.

In an embodiment, the protecting device further intercepts a third packet whose destination address is the IP address of the protected device. In response to that a source address of the third packet is an attack source address, the protecting device discards the third packet.

In an embodiment, the protecting device discards the intercepted packet from the attack source address, to implement effective defense against the attack packet.

In an embodiment, the protecting device further intercepts a fourth packet whose destination address is the IP address of the protected device. In response to that a source address of the fourth packet is a normal source address, the protecting device sends the fourth packet to the protected device.

In an embodiment, the protecting device sends the packet from the normal source address to the protected device, to implement normal communication between the normal client and the protected device.

In an embodiment, the first retry packet carries a first indication, and the response packet is a packet whose source address is the source address of the first packet, whose destination address is the IP address of the protected device, and that carries the first indication.

In an embodiment, the response packet is an initial packet.

In an embodiment, the first indication is in each of a token field of the first retry packet and a token field of the response packet.

In an embodiment, before the protecting device sends the first retry packet to the source address of the first packet, the protecting device generates the first indication based on target field content in a packet header of the first packet. Alternatively, the protecting device generates the first indication based on a random number. Alternatively, the protecting device generates the first indication based on a current timestamp.

In an embodiment, the protecting device generates an indication based on the target field content in the packet header of the packet, so that different indications are generated for different packets; or the protecting device generates an indication based on a periodically updated random number, so that the protecting device can periodically update the generated indication; or the protecting device generates an indication based on a current timestamp, so that the protecting device can generate different indications at different moments, that is, the indications generated by the protecting device are not constant. This reduces a risk that the attacker launches a playback attack after stealing the indication generated by the protecting device.

In an embodiment, the protecting device performs a target operation on the target field content, to obtain the first indication, where the target operation includes one or more of a summation operation, an exclusive OR operation, or a hash operation.

In an embodiment, after sending the first retry packet to the source address of the first packet, and receiving a packet whose source address is the source address of the first packet and whose destination address is the IP address of the protected device, the protecting device performs the target operation on target field content in a packet header of the packet, to obtain a second indication. If a specified field of the packet carries the second indication, the protecting device determines that the response packet is received, where the specified field is a pre-agreed field in which the response packet needs to carry the first indication.

In an embodiment, after sending the first retry packet to the source address of the first packet, and subsequently receiving the packet whose source address and destination address are respectively the same as those of the first packet, the protecting device calculates an indication value based on the target field content in the packet header of the packet in a same way the protecting device calculates the first indication, and compares whether a value of a specified field of the packet is the same as the calculated indication value, to verify whether the packet is the response packet corresponding to the first retry packet. The protecting device does not need to store the generated first indication.

In an embodiment, the target field content includes one or more of a source IP address, a source port number, a destination IP address, a destination port number, a source connection identifier, or a destination connection identifier.

In different packets sent by a same device to another device, the foregoing target field content is the same.

In an embodiment, when it is determined that the protected device is under a traffic attack, the protecting device intercepts a packet whose destination address is the IP address of the protected device.

In an embodiment, when the protected device is under the traffic attack, the protecting device intercepts the packet whose destination address is the IP address of the protected device. When the protected device is not under the traffic attack, the protecting device does not intercept the packet whose destination address is the IP address of the protected device. This can not only effectively protect the protected device, but also reduce as much processing overheads of the protecting device as possible.

According to a second aspect, a protecting device is provided. The protecting device includes a plurality of function modules, and the plurality of function modules interact with each other to implement the method according to the first aspect and the embodiments in the first aspect. The plurality of function modules may be implemented based on software, hardware, or a combination of software and hardware, and the plurality of function modules may be randomly combined or divided based on a specific embodiment.

According to a third aspect, a protecting device is provided, including a memory, a network interface, and at least one processor.

The memory is configured to store program instructions.

After the at least one processor reads the program instructions stored in the memory, the protecting device performs the method according to the first aspect and the embodiments in the first aspect.

According to a fourth aspect, a computer-readable storage medium is provided. The computer-readable storage medium stores instructions, and when the instructions are executed by a processor, the method according to the first aspect and the embodiments in the first aspect is implemented.

According to a fifth aspect, a computer program product is provided, including a computer program. When the computer program is executed by a processor, the method according to the first aspect and the embodiments in the first aspect is implemented.

According to a sixth aspect, a chip is provided. The chip includes a programmable logic circuit and/or program instructions. When the chip is run, the method according to the first aspect and the embodiments in the first aspect is implemented.

BRIEF DESCRIPTION OF DRAWINGS

FIG. 3 is a schematic flowchart of a method for identifying a source address of a packet according to an embodiment of this application;

DESCRIPTION OF EMBODIMENTS

Figure 1:
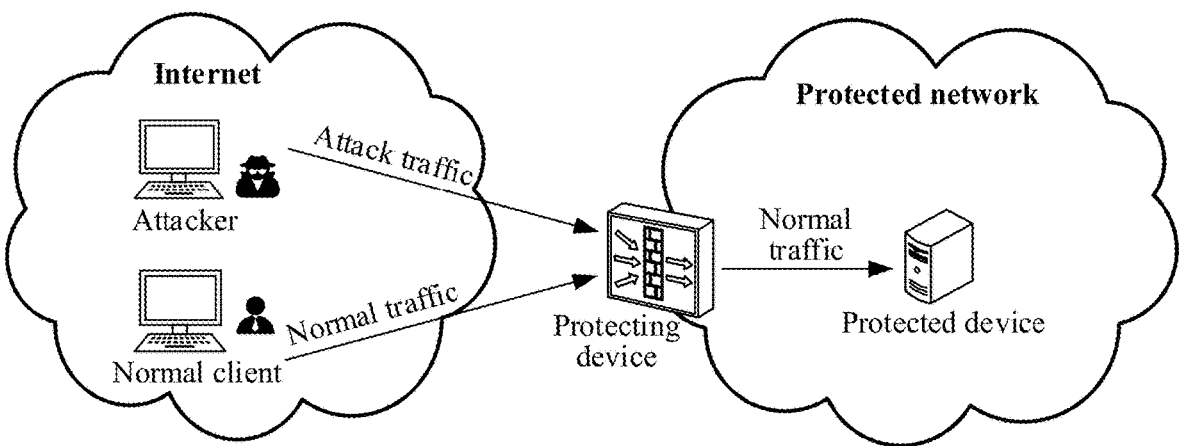
FIG. 1 is a schematic diagram of an application scenario according to an embodiment of this application.

To make the objectives, technical solutions, and advantages of this application clearer, the following further describes embodiments of this application in detail with reference to the accompanying drawings.

The QUIC protocol is a UDP-based low-latency transport layer protocol. Currently, an attacker may attack, by sending a large quantity of QUIC packets, a protected device that externally provides a service according to the QUIC protocol, causing the protected device to deny access to the service. When UDP flood attack defense based on a rate limiting mechanism of a protecting device is used, the protecting device cannot identify whether the QUIC packets sent to the protected device are normal packets from a normal client or attack packets from an attacker. As a result, the normal packets may be discarded by the protecting device, thereby damaging a normal service. Optionally, a QUIC packet includes an initial packet, a retry packet, a connection close packet, a service packet, and the like. The initial packet is also referred to as an initialization packet, and is used for negotiating a connection parameter, for example, an encryption key. The retry packet is used for verifying validity of a client. The connection close packet is used for closing a current connection.

In view of this, embodiments of this application provide a technical solution for identifying a source address of a packet. By implementing this technical solution, the protecting device sends a retry packet to a source address of an initial packet when intercepting the initial packet and a destination address of the initial packet is an IP address of the protected device that provides a service according to the QUIC protocol. If the protecting device receives no response packet corresponding to the retry packet, the protecting device identifies the source address of the initial packet as an attack source address, so that any subsequent packet from the attack source address is identified as an attack packet, thereby implementing effective defense against the attack packet.

In an embodiment, if the protecting device receives the response packet corresponding to the retry packet, the protecting device identifies the source address of the initial packet as a normal source address, so that any subsequent packet from the normal source address is identified as a normal packet and then sent to the protected device, thereby ensuring normal service running.

In this embodiment, the protecting device can identify, based on the source address of the packet sent to the protected device, whether the packet is a normal packet from the normal client or an attack packet from the attacker, to prevent the attack packet from being sent to the protected device, and allow the normal packet from the normal client to be sent to the protected device. This can not only effectively defend against an attack, but also ensure normal service running, thereby improving normal service running reliability.

In some embodiments, the protecting device processes the intercepted packet based on a blocklist and trustlist mechanism. The blocklist records attack source addresses, and the trustlist records normal source addresses. Optionally, the attack source addresses in the blocklist include historical attack source addresses identified by the protecting device and/or externally input known attack source addresses. The normal source addresses in the trustlist include historical normal source addresses identified by the protecting device and/or externally input known normal source addresses. In this embodiment, if the protecting device intercepts an initial packet whose destination address is the IP address of the protected device and whose source address is an unknown address, the protecting device sends a retry packet to the source address of the initial packet. If the protecting device intercepts a non-initial packet whose destination address is the IP address of the protected device and whose source address is an unknown address, the protecting device discards the non-initial packet. If the protecting device intercepts a packet whose destination address is the IP address of the protected device and whose source address is an attack source address, the protecting device discards the packet. If the protecting device intercepts a packet whose destination address is the IP address of the protected device and whose source address is a normal source address, the protecting device sends the packet to the protected device.

In an embodiment, an aging time is set for the attack source addresses in the blocklist, that is, the attack source addresses in the blocklist have time validity. Because the attacker may update a virtual source address used for initiating DDOS attacks at intervals, an aging mechanism is set for the blocklist to clear invalid attack source addresses in the blocklist. This can reduce not only waste of storage resources of the protecting device, but also a quantity of attack source addresses in the blocklist, to improve efficiency of querying the blocklist by the protecting device and thereby improve protection efficiency of the protecting device.

In an embodiment, an aging time is set for the normal source addresses in the trustlist, that is, the normal source addresses in the trustlist have time validity. Because the normal client may need to access the protected device only within a specific period of time, the aging mechanism is set for the trustlist to clear expired normal source addresses in the trustlist. This can reduce not only waste of storage resources of the protecting device, but also a quantity of normal source addresses in the trustlist, to improve efficiency of querying the trustlist by the protecting device, and thereby improve protection efficiency of the protecting device.

In this embodiment, the aging mechanism is set for the blocklist and/or the trustlist in the protecting device, so that the protecting device can better respond to a change of a network environment.

A basic principle of identifying a source address of a packet in the foregoing technical solution is as follows. According to a requirement of the QUIC protocol, when a client wants to access the protected device, the client first needs to establish a communication connection to the protected device. In a process of establishing the communication connection, the client sends an initial packet to the protected device. In an embodiment, the protecting device intercepts a packet sent to the protected device, and when intercepting the initial packet, the protecting device sends a retry packet to the source address of the initial packet. For a normal client, if the normal client receives the retry packet, the normal client responds to the retry packet, that is, sends a response packet corresponding to the retry packet. For an attacker, the attacker uses a forged source IP address to send a packet to the protected device, and therefore, the attacker does not respond to the retry packet. Based on this, in an embodiment, the protecting device can determine, based on whether the response packet corresponding to the retry packet is received, whether the source address of the intercepted initial packet is an attack source address or a normal source address, to effectively identify the source address of the packet. In addition, for the normal client, after sending the initial packet to the protected device, if the retry packet is received, the normal client sends the response packet corresponding to the retry packet to the protected device to verify validity of the normal client. The normal client does not need to identify whether the received retry packet is sent by the protecting device or the protected device, and only needs to respond according to the existing QUIC protocol. Therefore, the technical solution of this application does not need to improve the client, and implementation is simple.

The technical solution provided in this application is used for defending against a DDOS attack initiated by the attacker on the protected device that provides a service according to the QUIC protocol.

The following describes the technical solution in detail from a plurality of perspectives such as an application scenario, a hardware apparatus, a software apparatus, and a method procedure.

The following describes an application scenario of embodiments of this application by using an example.

For example, FIG. 1 is a schematic diagram of an application scenario according to an embodiment of this application. The application scenario shown in FIG. 1 is a typical DDOS protection scenario. As shown in FIG. 1, the protection scenario relates to four network devices: a normal client, an attacker, a protecting device, and a protected device. The following separately describes the four network devices by using examples.

(1) Normal Client

A normal client is an initiator of normal traffic. The normal client generates the normal traffic and sends the normal traffic to a server to access a service provided by the server. In an embodiment of this application, the normal client is an application program that supports the QUIC protocol. The normal client accesses the service provided by the server through the QUIC protocol. The normal client is, for example, browser software or service client software. Optionally, the normal client is installed in various devices having a computing capability in the Internet. After the normal client in the Internet initiates the normal traffic, a protecting device intercepts the normal traffic and performs security detection on the normal traffic. When it is determined that the normal traffic is not a threat, the protecting device forwards the normal traffic to the protected device in a protected network.

(2) Attacker

An attacker uses tools, zombie hosts, or agents to generate and send attack traffic to the protected device. Optionally, the attacker is located in the Internet, that is, the attacker initiates an attack from the Internet on the protected device in the protected network.

(3) Protected Device

A protected device is located in a protected network. From a perspective of the protected device, the protected network in which the protected device is located is an internal network, and the Internet is an external network. Optionally, the protected network includes one or more local area networks. The protected device is a protected server. The protected device is configured to provide a service for the normal client. In an embodiment of this application, the protected device provides the service according to the QUIC protocol. The protected device includes, but is not limited to, an application server or a web server. The application server includes, but is not limited to, a game server, a video application server, a file server, a search engine server, an instant messaging server, and the like. The web server is also referred to as a world wide web server or a Web server.

(4) Protecting Device

A protecting device is deployed between the Internet and the protected network. In other words, the protecting device is deployed at a border of the protected network to protect the protected device in the protected network from attacks. The protecting device performs security detection on traffic entering the protected network to determine whether the traffic is normal traffic or attack traffic. The protecting device blocks the attack traffic to ensure security of the protected device and forwards the normal traffic to ensure that the protected device can provide the service for the normal client. The protecting device includes, but is not limited to, one or an integration of more of the following: a firewall, a security gateway (such as a router or switch), an intrusion detection system (IDS) device, an intrusion prevention system (IPS) device, a unified threat management (UTM) device, an anti-virus (AV) device, an anti-distributed denial of service (anti-DDoS) device, and a next-generation firewall (NGFW).

The following describes a basic hardware structure of the protecting device by using an example.

Figure 2:
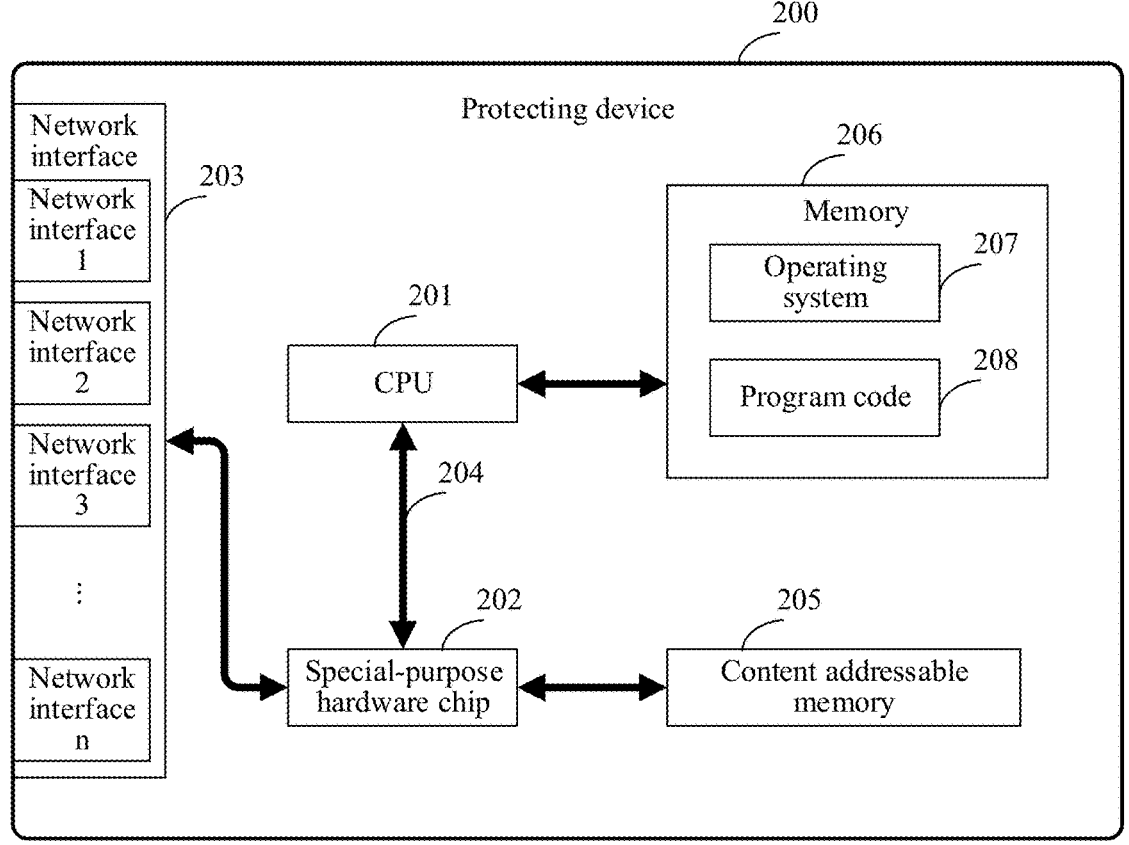
FIG. 2 is a schematic diagram of a structure of a protecting device according to an embodiment of this application.

For example, FIG. 2 is a schematic diagram of a structure of a protecting device according to an embodiment of this application. As shown in FIG. 2, a protecting device 200 includes a central processing unit (CPU) 201, a special-purpose hardware chip 202, and at least one network interface 203. The CPU 201 and the special-purpose hardware chip 202 may be collectively referred to as a processor. Optionally, with reference to FIG. 1, the protecting device 200 in FIG. 2 is the protecting device shown in FIG. 1.

The CPU 201 is a general-purpose central processing unit, and has relatively high scalability and flexibility. The CPU 201 is, for example, a single-core processor (single-CPU), or a multi-core processor (multi-CPU).

The special-purpose hardware chip 202 is a high-performance processing hardware module. The special-purpose hardware chip 202 includes at least one of an application-specific integrated circuit (ASIC), a field programmable gate array (FPGA), or a network processor (NP).

The at least one network interface 203 includes, for example, a network interface 1, a network interface 2, a network interface 3, . . . , and a network interface n in FIG. 2. The network interface 203 uses any apparatus such as a transceiver, and is configured to communicate with another device or a communication network. For example, the network interface 1 in FIG. 2 communicates with a protected device, and the network interface 2 in FIG. 2 communicates with a normal client. Optionally, the network interface 203 includes a wired network interface and/or a wireless network interface. The wired network interface is, for example, an Ethernet interface. The Ethernet interface is, for example, an optical interface, an electronic interface, or a combination thereof. The wireless network interface is, for example, a wireless protected network (WLAN) interface, a cellular network interface, or a combination thereof.

The at least one network interface 203 is connected to the special-purpose hardware chip 202, and the special-purpose hardware chip 202 is connected to the CPU 201 by an internal connection 204. The internal connection 204 includes a path for transmitting data among the network interface 203, the special-purpose hardware chip 202, and the CPU 201. Optionally, the internal connection 204 is a board or a bus. For example, the internal connection 204 is an Ethernet, a fiber channel, a PCI-E (peripheral component interconnect express, PCI Express, a high-speed serial computer bus), a RapidIO (a high-performance, low-pin-count, and packet-switched interconnect architecture), an infinite bandwidth (InfiniBand), or an XAUI bus (an interface extender, characterized by connecting an Ethernet media access control (MAC) layer to a physical layer).

Optionally, the protecting device 200 further includes a content addressable memory (CAM) 205. The CAM 205 is, for example, a ternary content addressable memory (TCAM). The CAM 205 is configured to store an IP address of a protected device having an attack risk and/or an IP address of a protected device having no attack risk. Optionally, the CAM 205 exists independently, and is connected to the special-purpose hardware chip 202 by the internal connection 204. Alternatively, the CAM 205 is integrated with the special-purpose hardware chip 202, that is, the CAM 205 is used as a memory inside the special-purpose hardware chip 202.

Optionally, the protecting device 200 further includes a memory 206. The memory 206 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or another compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code 208 in a form of an instruction or a data structure and capable of being accessed by a computer. This is not limited thereto. Optionally, the memory 206 is further configured to separately store a blocklist and a trustlist. The blocklist includes an IP address of an attack source, and the trustlist includes an IP address of a normal client. Both the blocklist and the trustlist can be accessed by the CPU 201. For example, the memory 206 exists independently, and is connected to the CPU 201 by the internal connection 204. Alternatively, the memory 206 and the CPU 201 are integrated together.

The memory 206 stores an operating system 207 and the program code 208. Optionally, the CPU 201 reads the operating system 207 from the memory 206 and runs the operating system 207. The CPU 201 further reads the program code 208 from the memory 206, and runs the program code 208 on the operating system 207 to implement the method provided in embodiments of this application. For example, the protecting device 200 is the protecting device shown in FIG. 1. In a process of running the program code 208, the CPU 201 executes the following process. The protecting device 200 intercepts a first packet whose destination address is an IP address of the protected device, and the protected device provides the service according to the QUIC protocol. In response to that the first packet is an initial packet, the protecting device 200 sends a first retry packet to a source address of the first packet. If the protecting device 200 receives no response packet corresponding to the first retry packet, the protecting device 200 identifies the source address of the first packet as an attack source address.

Optionally, the foregoing components are separately disposed on chips that are independent of each other, or at least some or all of the components are disposed on a same chip. Whether the components are independently disposed on different chips or are integrated on one or more chips usually depends on a requirement of product design. A specific implementation form of the foregoing components is not limited in this embodiment of this application.

The following describes a method procedure in embodiments of this application by using an example.

FIG. 3 is a schematic flowchart of a method 300 for identifying a source address of a packet according to an embodiment of this application. The method 300 includes the following operations 301 to 304.

Optionally, a network deployment scenario on which the method 300 is based is shown in FIG. 1. A protecting device in the method 300 is the protecting device in FIG. 1. In the method 300, traffic passing through the protecting device comes from the normal client or the attacker in FIG. 1. A protected device in the method 300 is the protected device in FIG. 1.

The protecting device in the method 300 includes, but is not limited to, one physical device, or a distributed system (sometimes also referred to as a protection system) including a plurality of physical devices. Optionally, the protecting device in the method 300 has the hardware structure shown in FIG. 2.

In operation 301, the protecting device intercepts a first packet whose destination address is an IP address of the protected device.

In an embodiment, when a predetermined condition is met, the protecting device starts the procedure shown in the method 300. The predetermined condition includes, but is In an embodiment, the target field content includes one or more of a source IP address, a source port number, a destination IP address, a destination port number, a source connection identifier (ID), or a destination connection identifier. For example, content of a plurality of fields in the packet header of the first packet is shown in Table 1.

TABLE 1

| Field | Source IP address | Source port | Destination IP address | Destination port | Source connection ID | Destination connection ID |
|---|---|---|---|---|---|---|
| Original content | 104.27.119.115 | 53080 | 192.168.31.204 | 443 | 560389 | 16470292 |
| In hexadecimal | 0x681b7773 | 0xcf58 | 0xc0a81fcc | 0x1bb | 0x88d05 | 0xfb5114 | not limited to, a situation in which the protected device is currently under attack, or a resource utilization rate of the protecting device lower than a set threshold, or that a protection request of the protected device is received.

For example, when the predetermined condition is the situation in which the protected device is currently under attack, the protecting device starts the procedure shown in the method 300 when determining that the protected device is under attack. Specifically, when the protected device is under a traffic attack, the protecting device intercepts a packet whose destination address is the IP address of the protected device. When the protected device is not under a traffic attack, the protecting device does not intercept a packet whose destination address is the IP address of the protected device. This can not only effectively protect the protected device, but also reduce as much processing over-heads of the protecting device as possible.

In an embodiment, in traffic that passes through the protecting device in unit time, if a quantity of packets whose destination addresses are an IP address of a same protected device is greater than a quantity threshold, the protecting device determines that the protected device is under a traffic attack.

In operation 302, in response to that the first packet is an initial packet, the protecting device sends a first retry packet to a source address of the first packet.

In an embodiment, the first retry packet carries a first indication. The first indication is in a specified field of the first retry packet, and the specified field is a pre-agreed field for a retry packet to carry the first indication. The pre-agreed herein may be understood as agreed on in a protocol or pre-negotiated. Optionally, the first indication is in a token (token) field of the first retry packet, that is, the first indication is a value of a token field of the first retry packet. After determining that the intercepted first packet is the initial packet, the protecting device generates the first indication. This embodiment of this application provides the following three embodiments in which the protecting device generates the first indication.

In a first embodiment, the protecting device generates the first indication based on target field content in a packet header of the first packet.

In an embodiment, the protecting device performs a target operation on the target field content in the packet header of the first packet, to obtain the first indication. The target operation includes one or more of a summation operation, an exclusive OR operation, or a hash operation.

It is assumed that a source IP address, a source port number, and a destination connection ID are selected to perform a summation operation, and a value of 32 bits is calculated and used as the value of the token field to represent the first indication. The first retry packet carries the first indication, including: setting the value of the token field in the first retry packet to 0x681b7773+0xcf58+0xfb5114=0x691797df.

In this embodiment, the protecting device generates the first indication based on the field content in the packet header of the first packet, so that the protecting device can generate different indications for different initial packets, that is, the indication generated by the protecting device is not constant. This reduces a risk that the attacker launches a playback attack after stealing the indication generated by the protecting device.

In a second embodiment, the protecting device generates the first indication based on a random number.

In an embodiment, the random number is periodically generated by the protecting device. For example, the protecting device updates a random number every minute. For example, a current random number is 418818144890, and the random number is updated to 742378908452 one minute later.

In this embodiment, the protecting device generates the first indication based on the periodically updated random number, so that the protecting device can periodically update the generated indication. That is, the indication generated by the protecting device changes with time, and is not constant. This reduces a risk that the attacker launches a playback attack after stealing the indication generated by the protecting device.

In a third embodiment, the protecting device generates the first indication based on a current timestamp.

In an embodiment, the current timestamp is a timestamp at which the protecting device receives the first packet, or the current timestamp is a start timestamp at which the protecting device generates the first indication. The timestamp is a Unix timestamp. For example, if current time is 2021 Aug. 27 15:32:00, a timestamp obtained through conversion is 1630049520.

In this embodiment, the protecting device generates the first indication based on the current timestamp, so that the protecting device can generate different indications at different moments. That is, the indication generated by the protecting device changes with time, and is not constant. This reduces a risk that the attacker launches a playback attack after stealing the indication generated by the protecting device.

In an embodiment, the foregoing three embodiments may be partially or wholly performed. The protecting device generates the first indication based on any two or all of the target field content in the packet header of the first packet, the random number, and the current timestamp.

In an embodiment of this application, after sending the first retry packet to the source address of the first packet, the protecting device needs to determine whether a response packet corresponding to the first retry packet is received within a period of time. Optionally, the first retry packet carries the first indication, and the response packet corresponding to the first retry packet is a packet whose source address is the source address of the first packet, whose destination address is the IP address of the protected device, and that carries the first indication.

In an embodiment, the response packet is an initial packet. The first indication in the response packet is in a token field of the response packet. For the normal client, after sending the initial packet to the protected device, if the retry packet is received, the normal client sends the initial packet to the protected device again, and sets the value of the token field of the initial packet to the value of the token field of the received retry packet. For the attacker, the attacker only continuously sends packets to the protected device, but does not respond to the received retry packets. In this embodiment, the protecting device uses a received packet whose source address is the source address of the first packet, whose destination address is the IP address of the protected device, and whose value of the token field is the same as the value of the token field of the first retry packet as the response packet corresponding to the first retry packet.

Optionally, in the foregoing three embodiments, after generating the first indication carried in the first retry packet, the protecting device stores a correspondence between the first indication and the source address and the destination address of the first packet, to verify whether a subsequently received packet whose source address and destination address are respectively the same as those of the first packet carries the first indication, and further determine whether the packet is the response packet corresponding to the first retry packet.

Alternatively, because target field content of the response packet corresponding to the first retry packet is respectively the same as the target field content of the first packet, in the first embodiment, after generating the first indication carried in the first retry packet, the protecting device does not need to store the first indication. After sending the first retry packet to the source address of the first packet, and subsequently receiving the packet whose source address and destination address are respectively the same as those of the first packet, the protecting device calculates an indication value based on the target field content in the packet header of the packet in a same way the protecting device calculates the first indication, and compares whether a value of a specified field of the packet is the same as the calculated indication value, to verify whether the packet is the response packet corresponding to the first retry packet. After receiving a packet whose source address is the source address of the first packet and whose destination address is the IP address of the protected device, the protecting device performs a target operation on the target field content in a packet header of the packet, to obtain a second indication. If the indication carried in the specified field of the packet is the same as the second indication, the protecting device determines that the response packet corresponding to the first retry packet is received. The target operation is an operation performed when the protecting device generates the first indication. The specified field is a pre-agreed field in which the response packet needs to carry the first indication. The pre-agreed herein may be understood as agreed on in a protocol or pre-negotiated. Optionally, the specified field is a token field.

In an embodiment of this application, the protecting device includes the first indication in the first retry packet, to verify whether a subsequently received packet carries the first indication, and then determine whether the response packet corresponding to the first retry packet is received.

In operation 303, if the protecting device receives no response packet corresponding to the first retry packet, the protecting device identifies the source address of the first packet as an attack source address.

In an embodiment, if the protecting device receives no response packet corresponding to the first retry packet, the protecting device updates a verification failure count corresponding to the source address of the first packet. If the updated verification failure count corresponding to the source address of the first packet reaches a threshold, the protecting device identifies the source address of the first packet as the attack source address.

Further, if the updated verification failure count corresponding to the source address of the first packet does not reach a threshold, after subsequently receiving another initial packet from the source address of the first packet and whose destination address is the IP address of the protected device, the protecting device sends a second retry packet to the source address of the first packet, to verify the source address of the first packet again. In other words, if the updated verification failure count corresponding to the source address of the first packet does not reach the threshold, the protecting device continues to verify the source address of the first packet.

In an embodiment, the threshold is greater than or equal to 1. If the threshold is equal to 1, the protecting device identifies the source address as the attack source address when the source address fails verification for the first time. If the threshold is greater than 1, the protecting device identifies the source address as the attack source address only when a same source address fails verification for a plurality of times. The threshold may be set and changed according to an actual protection requirement. A specific value of the threshold is not limited in this embodiment of this application.

In an embodiment, after identifying the source address of the first packet as the attack source address, the protecting device considers a subsequently received packet from the source address of the first packet as an attack packet, thereby implementing effective defense against the attack packet.

In operation 304, if the protecting device receives the response packet corresponding to the first retry packet, the protecting device identifies the source address of the first packet as a normal source address.

Further, after the protecting device identifies the source address of the first packet as the normal source address, the protecting device sends a connection close packet to the source address of the first packet. The connection close packet indicates to end a current connection, so that a device sending the first packet resends the initial packet to the protected device when the device needs to access the protected device. After the protecting device receives a packet from the source address of the first packet again, the protecting device sends the packet to the protected device, so that the source end device of the first packet can normally communicate with the protected device.

In an embodiment, after identifying the source address of the first packet as the normal source address, the protecting device considers a subsequently received packet from the source address of the first packet as a normal packet and sends the normal packet to the protected device, to ensure normal service running.

In this embodiment of this application, the protecting device can identify, based on the source address of the packet sent to the protected device, whether the packet is the normal packet from the normal client or the attack packet from the attacker, to prevent the attack packet from being sent to the protected device, and allow the normal packet from the normal client to be sent to the protected device. This can not only effectively defend against an attack, but also ensure normal service running, thereby improving normal service running reliability.

Optionally, in operation 302, in response to that the source address of the first packet is an unknown address and the first packet is an initial packet, the protecting device sends the first retry packet to the source address of the first packet. Optionally, if the source address of the first packet is a known address, or the first packet is not an initial packet, the protecting device does not send the first retry packet to the source address of the first packet.

In an embodiment, if the source address of the first packet is an unknown address and the second packet is not an initial packet, the protecting device discards the first packet. Because the normal client can access the protected device only after establishing a communication connection to the protected device, before sending the service packet to the protected device, the normal client sends the initial packet to the protected device to establish the communication connection to the protected device. If the source address of the first packet is an unknown address, it indicates that the device sending the first packet has not yet sent the initial packet to the protected device, or does not respond to the retry packet sent by the protecting device after sending the initial packet to the protected device. Therefore, the protecting device does not identify the source address as the normal source address. In this case, the source address of the first packet is largely an attack source address, and therefore the protecting device directly discards the first packet.

In an embodiment, if the source address of the first packet is the attack source address (a known address), the protecting device discards the first packet, thereby implementing effective defense against the attack packet.

In an embodiment, if the source address of the first packet is the normal source address (a known address), the protecting device sends the first packet to the protected device, to implement normal communication between the source end device of the first packet and the protected device.

In this embodiment of operation 302, the protecting device stores a blocklist and a trustlist. The blocklist records known attack source addresses, and the trustlist records known normal source addresses. The protecting device further intercepts the second packet whose destination address is the IP address of the protected device; and in response to that a source address of the second packet is an unknown address and the second packet is not an initial packet, the protecting device discards the second packet. In addition/Alternatively, the protecting device further intercepts a third packet whose destination address is the IP address of the protected device; and in response to that a source address of the third packet is an attack source address, the protecting device discards the third packet. In addition/Alternatively, the protecting device further intercepts a fourth packet whose destination address is the IP address of the protected device; and in response to that a source address of the fourth packet is a normal source address, the protecting device sends the fourth packet to the protected device.

Figure 4:
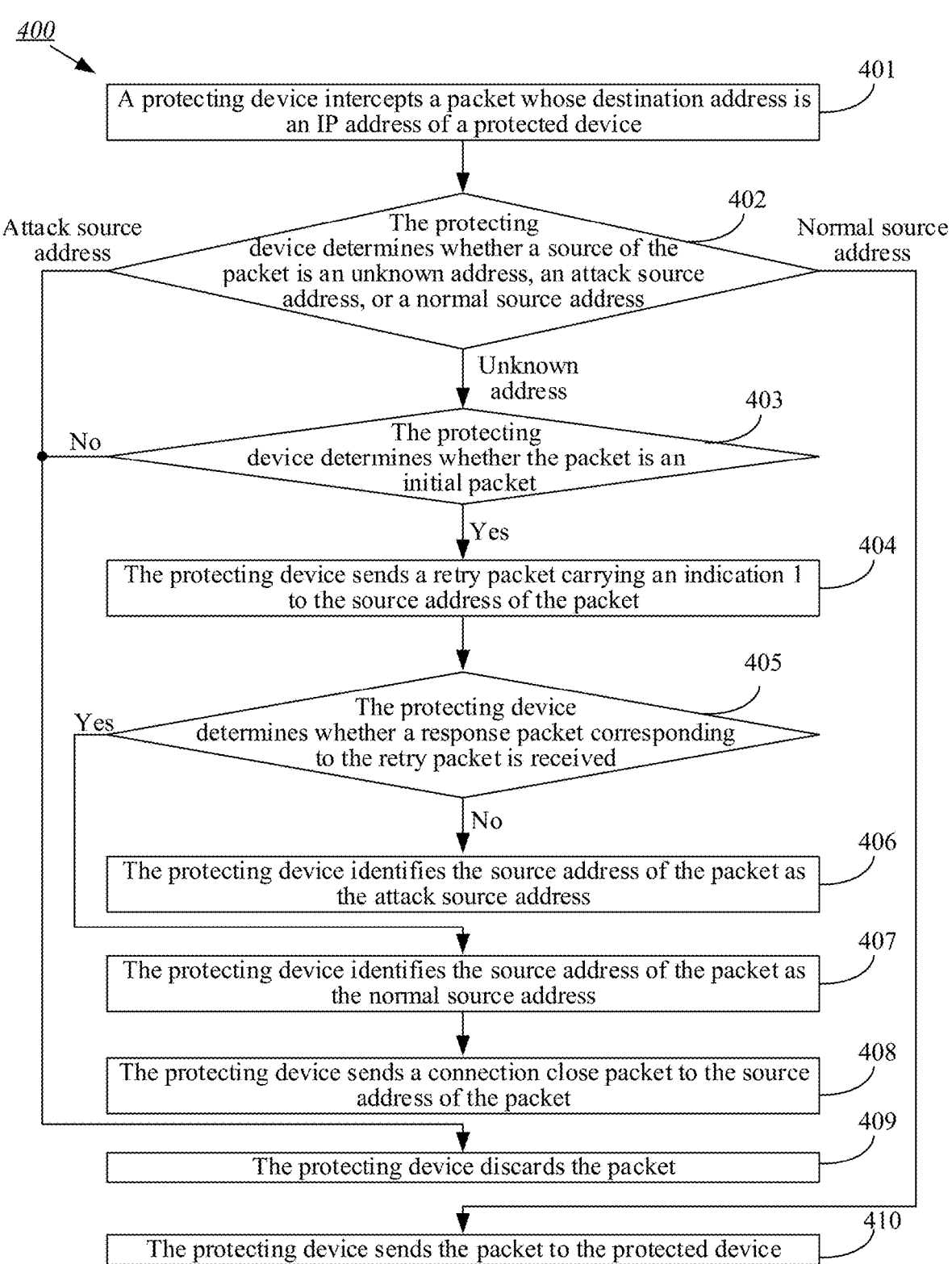
FIG. 4 is a schematic flowchart of another method for identifying a source address of a packet according to an embodiment of this application.

Optionally, with reference to the foregoing embodiment of operation 302, an implementation process of the technical solution of this application is described in detail by using the following embodiment. FIG. 4 is a schematic flowchart of a method 400 for identifying a source address of a packet according to an embodiment of this application. The method 400 includes the following operation 401 to operation 410.

Optionally, a network deployment scenario on which the method 400 is based is shown in FIG. 1. A protecting device in the method 400 is the protecting device in FIG. 1. In the method 400, traffic passing through the protecting device comes from the normal client or the attacker in FIG. 1. A protected device in the method 400 is the protected device in FIG. 1.

The protecting device in the method 400 includes, but is not limited to, one physical device, or a distributed system (sometimes also referred to as a protection system) including a plurality of physical devices. Optionally, the protecting device in the method 400 has the hardware structure shown in FIG. 2.

In operation 401, the protecting device intercepts a packet whose destination address is an IP address of the protected device.

The packet is any packet whose destination address is the IP address of the protected device and that is intercepted by the protecting device. For example, the packet may be the first packet, the second packet, the third packet, or the fourth packet. For specific explanations and implementations of operation 401, refer to related descriptions in operation 301. Details are not described herein again in this embodiment of this application.

In operation 402, the protecting device determines whether a source address of the packet is an unknown address, an attack source address, or a normal source address; and performs operation 403 if the source address of the packet is an unknown IP address, performs operation 409 if the source address of the packet is the attack source address, or performs operation 410 if the source address of the packet is the normal source address.

In an embodiment, the protecting device stores a blocklist and a trustlist. If the source address of the packet is in the blocklist, the protecting device determines that the source address of the packet is the attack source address. If the source address of the packet is in the trustlist, the protecting device determines that the source address of the packet is the normal source address. If the source address of the packet is neither in the blocklist nor in the trustlist, the protecting device determines that the source address of the packet is the unknown address.

In an embodiment, the protecting device first queries whether the source address of the packet is recorded in the stored blocklist. If the source address of the packet is not recorded in the blocklist, the protecting device queries whether the source address of the packet is recorded in the stored trustlist. Alternatively, the protecting device first queries whether the source address of the packet is recorded in the stored trustlist. If the source address of the packet is not recorded in the trustlist, the protecting device queries whether the source address of the packet is recorded in the blocklist. Alternatively, the protecting device separately queries whether the source address of the packet is recorded in the stored blocklist and trustlist at the same time. A sequence in which the protecting device queries the blocklist and the trustlist is not limited in this embodiment of this application.

In operation 403, the protecting device determines whether the packet is an initial packet; and performs operation 404 if the packet is the initial packet, or performs operation 409 if the packet is not the initial packet.

In operation 404, the protecting device sends a retry packet that carries an indication 1 to the source address of the packet.

For specific explanations and implementations of operation 404, refer to related descriptions in operation 302. Details are not described herein again in this embodiment of this application.

In operation 405, the protecting device determines whether a response packet corresponding to the retry packet is received; and performs operation 406 if the protecting device receives no response packet corresponding to the retry packet, or performs operation 407 if the protecting device receives the response packet corresponding to the retry packet.

A source address of the response packet corresponding to the retry packet is the source address of the packet intercepted by the protecting device in operation 401, and a destination address of the response packet is the destination address of the packet intercepted by the protecting device in operation 401 (that is, the IP address of the protected device). For specific explanations and implementations of operation 405, refer to related descriptions in operation 302. Details are not described herein again in this embodiment of this application.

In operation 406, the protecting device identifies the source address of the packet as the attack source address.

For specific explanations and implementations of operation 406, refer to related descriptions in operation 303. Details are not described herein again in this embodiment of this application.

In operation 407, the protecting device identifies the source address of the packet as the normal source address.

For specific explanations and implementations of operation 407, refer to related descriptions in operation 304. Details are not described herein again in this embodiment of this application.

In operation 408, the protecting device sends a connection close packet to the source address of the packet.

If a device to which the source address of the packet belongs still needs to access the protected device, after receiving the connection close packet, the device sends the initial packet to the protected device again. After the protecting device receives a packet (regardless of an initial packet or a service packet) from the normal source address, the protecting device sends the packet to the protected device, so that a communication connection between the device to which the normal source address belongs and the protected device can be established for normal communication.

In operation 409, the protecting device discards the packet.

In operation 410, the protecting device sends the packet to the protected device.

In an embodiment of this application, the blocklist stores known attack source addresses, or the trustlist stores known normal source addresses. When subsequently receiving an initial packet, the protecting device matches a source address of the initial packet with the blocklist or the trustlist before verifying, based on the retry packet, the source address of the initial packet, so that a quantity of initial packets that need to be verified can be reduced, and protection efficiency of the protecting device can be improved. A sequence of operations in the method for identifying a source address of a packet provided in this embodiment of this application can be properly adjusted, and operations can also be correspondingly added or deleted based on a situation. Any variation method readily figured out by a person skilled in the art within the technical scope disclosed in this application shall fall within the protection scope of this application.

The following describes a virtual apparatus in embodiments of this application by using an example.

Figure 5:
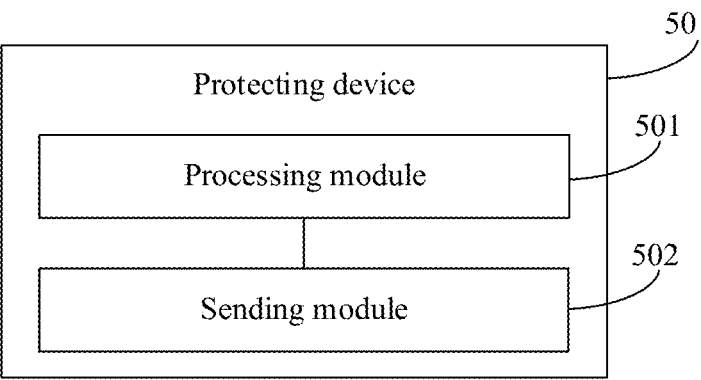
FIG. 5 is a schematic diagram of a structure of a protecting device according to an embodiment of this application.

FIG. 5 is a schematic diagram of a structure of a protecting device according to an embodiment of this application. The protecting device having the structure shown in FIG. 5 implements functions of the protecting device in the solution described in the foregoing embodiments. Optionally, the protecting device shown in FIG. 5 is the protecting device in the application scenario shown in FIG. 1 and the protecting device shown in FIG. 2, and performs a function of the protecting device described in the embodiment shown in FIG. 3 or FIG. 4. As shown in FIG. 5, a protecting device 50 includes a processing module 501 and a sending module 502.

The processing module 501 is configured to intercept a first packet whose destination address is an IP address of a protected device, and the protected device provides a service according to the QUIC protocol. The sending module 502 is configured to send a first retry packet to a source address of the first packet in response to that the first packet is an initial packet. The processing module 501 is further configured to identify the source address of the first packet as an attack source address if the protecting device receives no response packet corresponding to the first retry packet.

For implementation processes of the processing module 501 and the sending module 502, refer to the descriptions in the foregoing method embodiments. For example, the processing module 501 intercepts, by using operation 301 in the method 300, the first packet whose destination address is the IP address of the protected device. The sending module 502 sends, by using operation 302 in the method 300, the first retry packet to the source address of the first packet in response to that the first packet is an initial packet. The processing module 501 further identifies, by using operation 303 in the method 300, the source address of the first packet as the attack source address when the protecting device receives no response packet corresponding to the first retry packet. Details are not described herein again in this embodiment of this application.

In an embodiment, the processing module 501 is configured to update a verification failure count corresponding to the source address of the first packet if the protecting device receives no response packet corresponding to the first retry packet; and identify the source address of the first packet as the attack source address if the updated verification failure count corresponding to the source address of the first packet reaches a threshold. For an implementation process of the processing module 501, refer to related descriptions of operation 303 in the method 300, or refer to related descriptions of operation 405 and operation 406 in the method 400.

In an embodiment, the processing module 501 is further configured to identify the source address of the first packet as the normal source address if the protecting device receives the response packet corresponding to the first retry packet. For an implementation process of the processing module 501, refer to related descriptions of operation 304 in the method 300, or refer to related descriptions of operation 405 and operation 407 in the method 400.

In an embodiment, the sending module 502 is further configured to send a connection close packet to the source address of the first packet after identifying the source address of the first packet as the normal source address, where the connection close packet indicates to end a current connection, so that a device sending the first packet resends the initial packet to the protected device when the device needs to access the protected device. For an implementation process of the sending module 502, refer to related descriptions of operation 408 in the method 400.

In an embodiment, the sending module 502 is further configured to send the first retry packet to the source address of the first packet in response to that the source address of the first packet is an unknown address and the first packet is an initial packet. For an implementation process of the sending module 502, refer to related descriptions of operation 302 in the method 300, or refer to related descriptions of operation 404 in the method 400.

In an embodiment, the processing module 501 is further configured to intercept a second packet whose destination address is the IP address of the protected device; and discard the second packet in response to that a source address of the second packet is an unknown address and the second packet is not an initial packet. For an implementation process of the processing module 501, refer to related descriptions of operation 403 and operation 409 in the method 400.

In an embodiment, the first retry packet carries a first indication, and the response packet is a packet whose source address is the source address of the first packet, whose destination address is the IP address of the protected device, and that carries the first indication.

In an embodiment, the response packet is an initial packet.

In an embodiment, the first indication is in each of a token field of the first retry packet and a token field of the response packet.

In an embodiment, the processing module 501 is further configured to generate the first indication based on target field content in a packet header of the first packet before sending the first retry packet to the source address of the first packet; or generate the first indication based on a random number; or generate the first indication based on a current timestamp. For an implementation process of the processing module 501, refer to related descriptions of operation 302 in the method 300.

In an embodiment, the processing module 501 is configured to perform a target operation on the target field content to obtain the first indication, where the target operation includes one or more of a summation operation, an exclusive OR operation, or a hash operation.

In an embodiment, the processing module 501 is further configured to perform the target operation on target field content in a packet header of the packet after sending the first retry packet to the source address of the first packet, and receiving a packet whose source address is the source address of the first packet and whose destination address is the IP address of the protected device, to obtain the second indication; and determine that the response packet is received if a specified field of the packet carries the second indication, where the specified field is a pre-agreed field in which the response packet needs to carry the first indication. For an implementation process of the processing module 501, refer to related descriptions of operation 302 in the method 300, or refer to operation 405 in the method 400.

In an embodiment, the target field content includes one or more of a source IP address, a source port number, a destination IP address, a destination port number, a source connection identifier, or a destination connection identifier.

In an embodiment, the processing module 501 is configured to intercept a packet whose destination address is the IP address of the protected device when it is determined that the protected device is under a traffic attack. For an implementation process of the processing module 501, refer to related descriptions of operation 301 in the method 300.

The apparatus embodiment described in FIG. 5 is merely an example. For example, the module division is merely logical function division and there may be another division manner during actual implementation. For example, a plurality of modules or components may be combined or integrated into another system, or some features may be ignored or not performed. Functional modules in embodiments of this application may be integrated into one processing module, or each module may exist alone physically, or two or more modules may be integrated into one module. The foregoing modules in FIG. 5 may be implemented in a form of hardware, or may be implemented in a form of a software functional unit. For example, when implemented by using software, the processing module 501 may be implemented by a software function module generated after the CPU 201 in FIG. 2 reads program code stored in the memory. The foregoing modules in FIG. 5 may alternatively be separately implemented by different hardware in the protecting device. For example, the processing module 501 is implemented by some processing resources (for example, a core in a multi-core processor) in the CPU 201 in FIG. 2, and the sending module 502 is implemented by the network interface 203 and other processing resources (for example, another core in the multi-core processor) in the CPU 201 in FIG. 2, or is implemented by the special-purpose hardware chip 202 in FIG. 2. It is clear that the foregoing function modules may alternatively be implemented by using a combination of software and hardware. For example, the sending module 502 is implemented by a hardware programmable device, and the processing module 501 is a software function module generated after the CPU reads the program code stored in the memory.

An embodiment of this application further provides a protecting device, including a memory, a network interface, and at least one processor.

The memory is configured to store program instructions.

After the at least one processor reads the program instructions stored in the memory, the protecting device is enabled to perform the operations in the method 300 or the method 400. Optionally, a hardware structure of the protecting device is shown in FIG. 2.

An embodiment of this application further provides a computer-readable storage medium. The computer-readable storage medium stores instructions. When the instructions are executed by a processor, the operations in the method 300 or the method 400 are implemented.

An embodiment of this application further provides a computer program product, including a computer program. When the computer program is executed by a processor, the operations in the method 300 or the method 400 are implemented.

In embodiments of this application, the term traffic is also referred to as network traffic or data traffic. The traffic refers to data transmitted over a network at a given time point. For example, traffic received by a device at a time point T refers to all packets received by the device at the time point T.

The embodiments in this specification are described in a progressive manner. For same or similar parts in the embodiments, reference may be made to each other. Each embodiment focuses on a difference from other embodiments.

In the specification of embodiments and claims of this application, the terms "first", "second", and the like are intended to distinguish between different objects but do not indicate a particular order of the objects, and cannot be understood as an indication or implication of relative importance. For example, the first packet and the second packet are used to distinguish between different packet groups, but are not used to describe a particular sequence of the packets.

In the descriptions of embodiments of this application, unless otherwise specified, "at least one" means one or more. "A plurality of" means two or more.

A refers to B, which means that A is the same as B or A is a simple variant of B.

The term "and/or" in this application describes only an association relationship for describing associated objects and represents that three relationships exist. For example, A and/or B represents the following three cases: Only A exists, both A and B exist, and only B exists. In addition, the character "/" in this specification generally indicates an "or" relationship between the associated objects.

Optionally, all or some of the foregoing embodiments are implemented by using software, hardware, firmware, or any combination thereof. Optionally, when software is used to implement the embodiments, all or some of the embodiments are implemented in a form of a computer program product. The computer program product includes one or more computer instructions. When the computer program instructions are loaded and executed on a computer, all or some of the procedures or functions according to embodiments of this application are generated. Optionally, the computer is a general-purpose computer, a dedicated computer, a computer network, or another programmable apparatus. Optionally, computer instructions are stored in a computer-readable storage medium, or is transmitted from one computer-readable storage medium to another computer-readable storage medium. For example, the computer instructions can be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. Optionally, the computer-readable storage medium is any usable medium accessible by a computer, or a data storage device, such as a server or a data center, integrating one or more usable media. Optionally, the usable medium is a magnetic medium (for example, a floppy disk, a hard disk, or a magnetic tape), an optical medium (for example, a DVD), a semiconductor medium (for example, a solid-state drive (SSD)), or the like.

In conclusion, the foregoing embodiments are merely intended for describing the technical solutions of this application, but not for limiting this application. Although this application is described in detail with reference to the foregoing embodiments, a person of ordinary skilled in the art should understand that modifications may still be made to the technical solutions described in the foregoing embodiments or equivalent replacements may be made to some technical features, and such modifications or replacements do not cause the essence of the corresponding technical solutions to depart from the scope of embodiments of this application.

What is claimed is:

1. A method for identifying a source address of a packet, comprising:

intercepting, by a protecting device, a first packet whose destination address is an internet protocol (IP) address of a protected device, wherein the protected device provides a service according to a quick user datagram protocol internet connections (QUIC) protocol;

sending, by the protecting device, a first retry packet to a source address of the first packet in response to determining that the first packet is an initial packet, wherein the first retry packet is sent carrying a first indication;

identifying, by the protecting device, the source address of the first packet as a normal source address in response to when the protecting device receives a response packet corresponding to the first retry packet, wherein the response packet is a packet whose source address is the source address of the first packet, whose destination address is the IP address of the protected device, and that carries the first indication; and identifying, by the protecting device, the source address of the first packet as an attack source address in accordance with when the protecting device receives no response packet corresponding to the first retry packet.

2. The method according to claim 1, wherein identifying the source address of the first packet as the attack source address comprises:

updating, by the protecting device, a verification failure count corresponding to the source address of the first packet in accordance with when the protecting device receives no response packet corresponding to the first retry packet; and identifying, by the protecting device, the source address of the first packet as the attack source address in accordance with when the updated verification failure count reaches a threshold.

3. The method according to claim 1, wherein before sending the first retry packet to the source address of the first packet, the method further comprises:

generating, by the protecting device, the first indication based on a current timestamp.

4. The method according to claim 1, further comprising:

sending, by the protecting device, a connection close packet to the source address of the first packet, wherein the connection close packet indicates to end a current connection for a device sending the first packet to resend the initial packet to the protected device when the device needs to access the protected device.

5. The method according to claim 1, wherein sending the first retry packet to the source address of the first packet in response to determining that the first packet is the initial packet comprises:

sending, by the protecting device, the first retry packet to the source address of the first packet in response to determining that the source address of the first packet is an unknown address and the first packet is the initial packet.

6. The method according to claim 5, further comprising:

intercepting, by the protecting device, a second packet whose destination address is the IP address of the protected device; and discarding, by the protecting device, the second packet in response to determining that a source address of the second packet is an unknown address and the second packet is not an initial packet.

7. The method according to claim 1, wherein before sending the first retry packet to the source address of the first packet, the method further comprises:

generating, by the protecting device, the first indication based on a random number.

8. The method according to claim 7, wherein the response packet is an initial packet.

9. The method according to claim 7, wherein the first indication is in each of a token field of the first retry packet and a token field of the response packet.

10. The method according to claim 1, wherein before sending the first retry packet to the source address of the first packet, the method further comprises:

generating, by the protecting device, the first indication based on target field content in a packet header of the first packet.

11. The method according to claim 10, wherein generating the first indication based on the target field content in the packet header of the first packet comprises:

performing, by the protecting device, a target operation on the target field content to obtain the first indication, wherein the target operation comprises one or more of a summation operation, an exclusive OR operation, or a hash operation.

12. The method according to claim 11, further comprising:

after receiving a packet whose source address is the source address of the first packet and whose destination address is the IP address of the protected device, performing, by the protecting device, the target operation on the target field content in a packet header of the packet to obtain a second indication; and in accordance with when a specified field of the packet carries the second indication, determining that the response packet is received, wherein the specified field is a pre-agreed field in which the response packet needs to carry the first indication.

13. The method according to claim 10, wherein the target field content comprises one or more of a source IP address, a source port number, a destination IP address, a destination port number, a source connection identifier, or a destination connection identifier.

14. The method according to claim 1, wherein before intercepting the first packet whose destination address is the IP address of the protected device, the method further comprises:

determining, by the protecting device, that the protected device is under a traffic attack.

15. A protecting device, comprising:

at least one processor; and a memory configured to store program instructions, which when executed by the at least one processor, cause the protecting device to perform operations, the operations comprising:

intercepting a first packet whose destination address is an internet protocol (IP) address of a protected device, wherein the protected device provides a service according to a quick user datagram protocol internet connections (QUIC) protocol;

sending a first retry packet to a source address of the first packet in response to determining that the first packet is an initial packet, wherein the first retry packet is sent carrying a first indication;

identifying, by the protecting device, the source address of the first packet as a normal source address in response to when the protecting device receives a response packet corresponding to the first retry packet, wherein the response packet is a packet whose source address is the source address of the first packet, whose destination address is the IP address of the protected device, and that carries the first indication; and identifying the source address of the first packet as an attack source address in accordance with when the protecting device receives no response packet corresponding to the first retry packet.

16. The protecting device according to claim 15, wherein the operations further comprise:

updating a verification failure count corresponding to the source address of the first packet if the protecting device receives no response packet corresponding to the first retry packet; and identifying the source address of the first packet as the attack source address if the updated verification failure count reaches a threshold.

17. The protecting device according to claim 15, wherein before sending the first retry packet to the source address of the first packet, the operations further comprise:

generating, by the protecting device, the first indication based on a current timestamp.

18. The protecting device according to claim 15, wherein the operations further comprise:

sending a connection close packet to the source address of the first packet, wherein the connection close packet indicates to end a current connection for a device sending the first packet to resend the initial packet to the protected device when the device needs to access the protected device.

19. The protecting device according to claim 15, wherein the operations further comprise:

sending the first retry packet to the source address of the first packet in response to determining that the source address of the first packet is an unknown address and the first packet is the initial packet.

20. A non-transitory computer-readable storage medium having instructions stored therein, which when executed by a processor, cause a protecting device to perform operations, the operations comprising:

intercepting a first packet whose destination address is an internet protocol (IP) address of a protected device, wherein the protected device provides a service according to a quick user datagram protocol internet connections (QUIC) protocol;

sending a first retry packet to a source address of the first packet in response to determining that the first packet is an initial packet, wherein the first retry packet is sent carrying a first indication;

identifying, by the protecting device, the source address of the first packet as a normal source address in response to when the protecting device receives a response packet corresponding to the first retry packet, wherein the response packet is a packet whose source address is the source address of the first packet, whose destination address is the IP address of the protected device, and that carries the first indication; and identifying the source address of the first packet as an attack source address in accordance with when the protecting device receives no response packet corresponding to the first retry packet.

\* \* \* \* \*